Patented Aug. 18, 1936

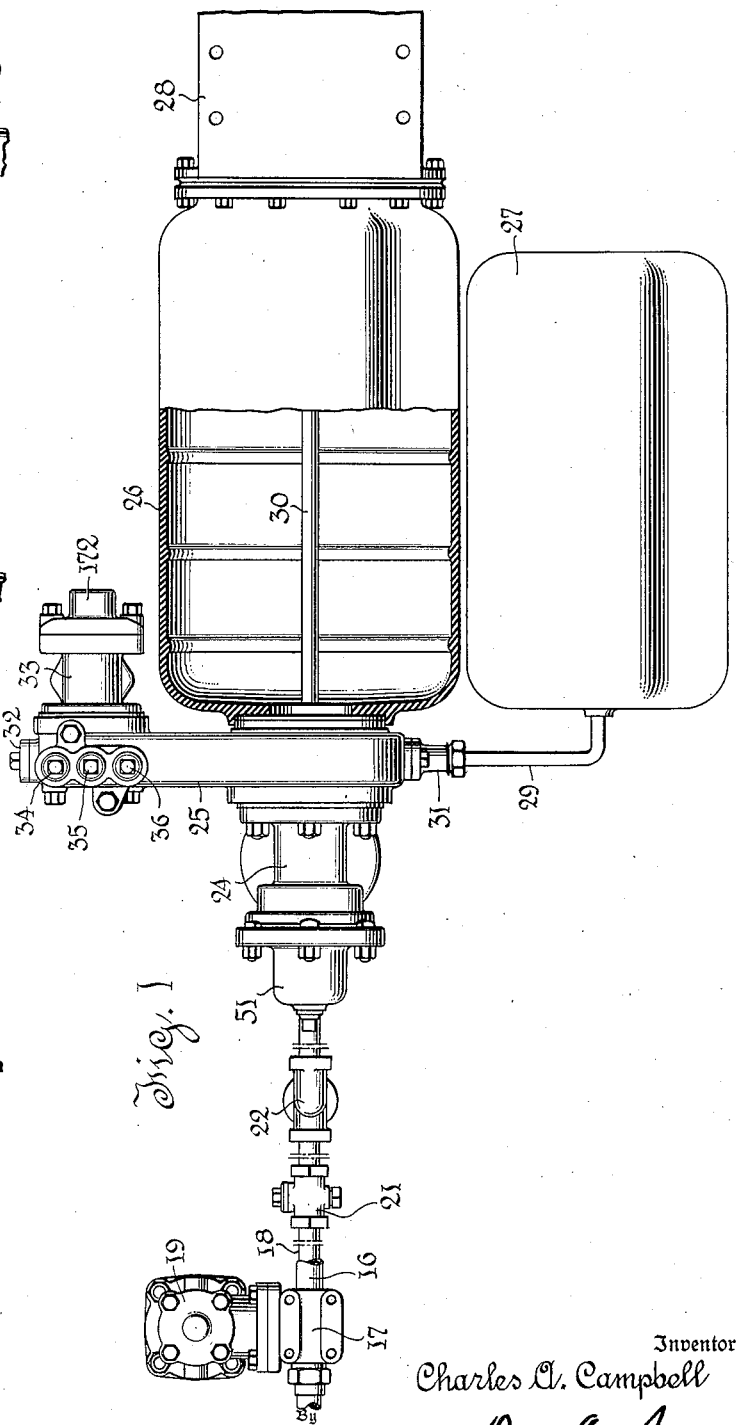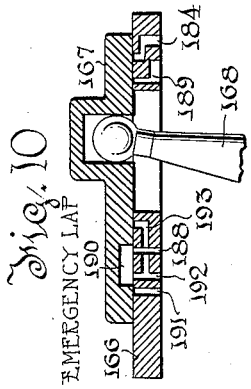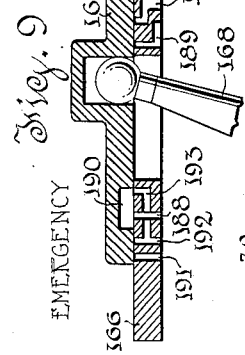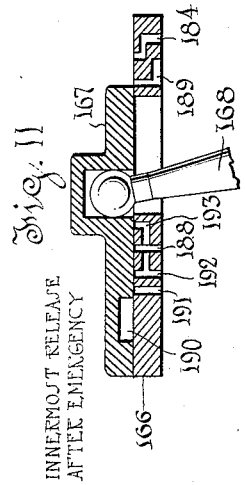

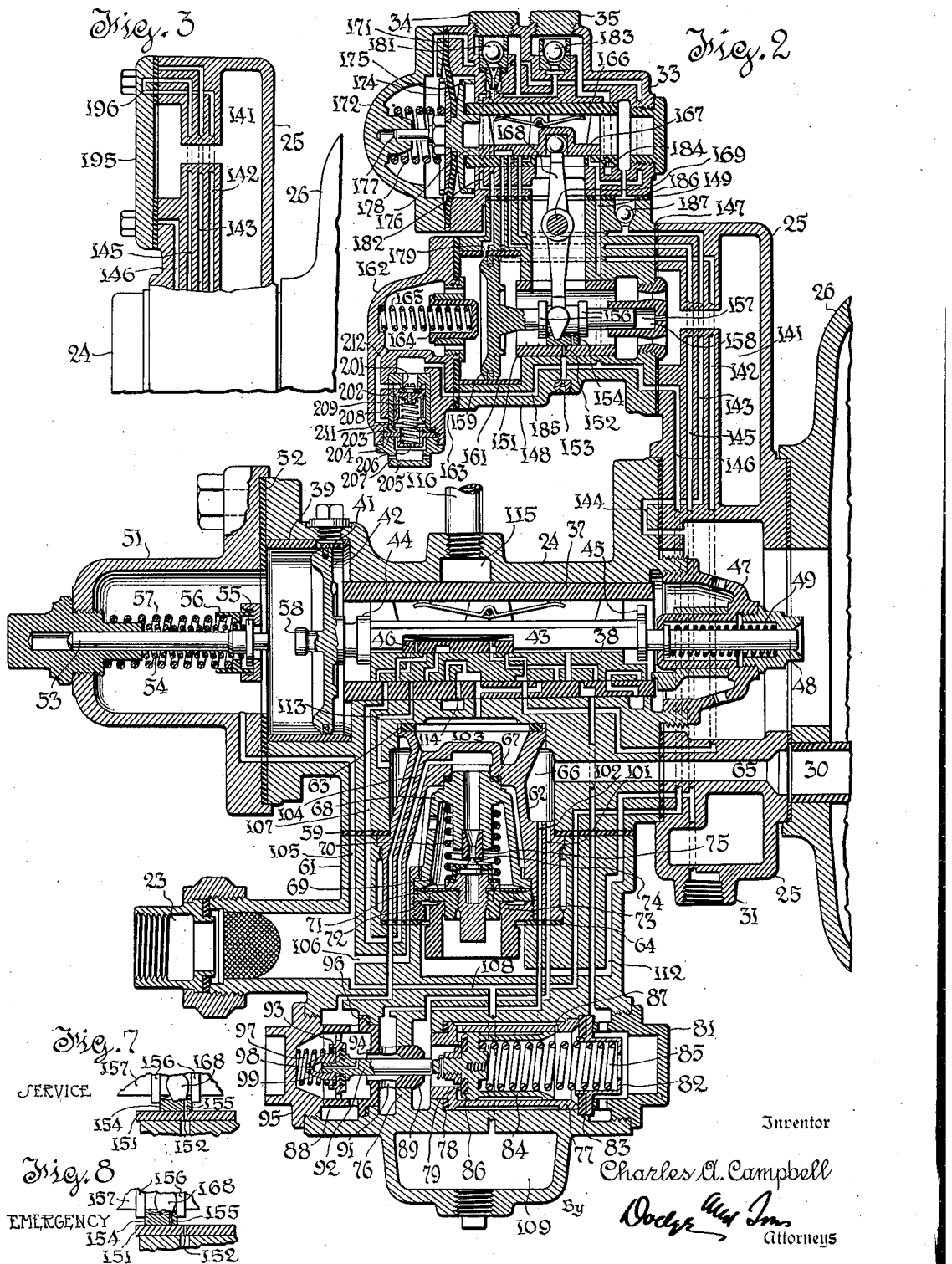

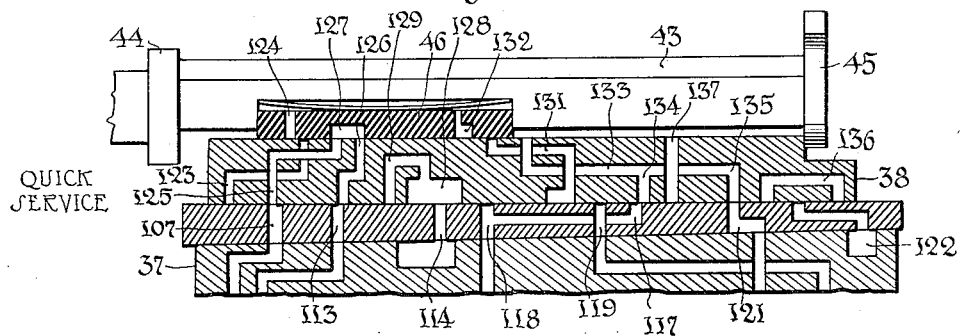
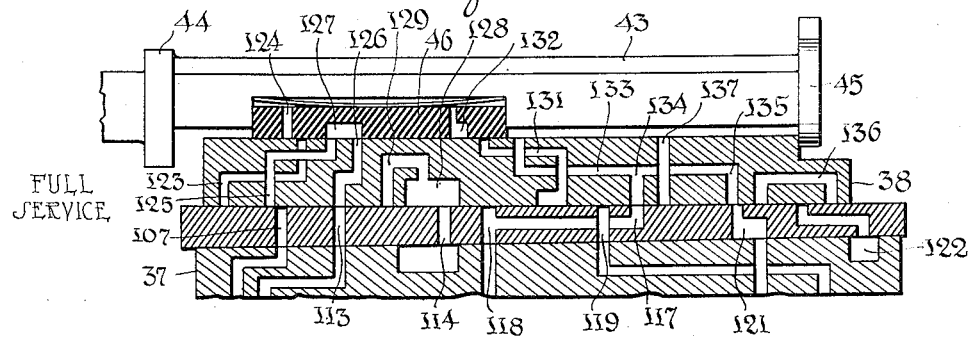
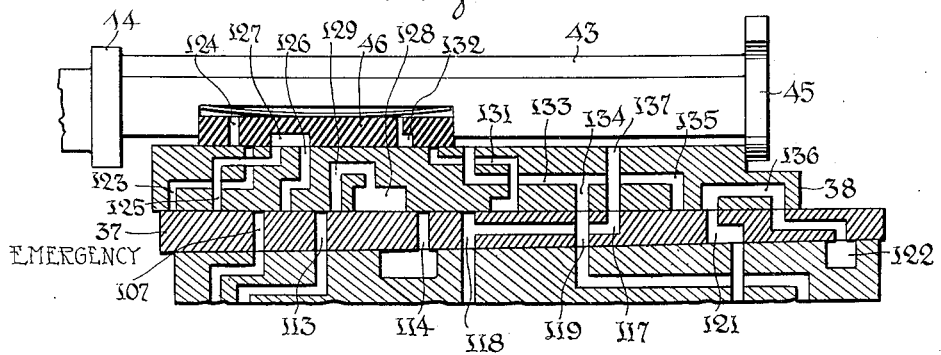

2,051,326

UNITED STATES PATENT OFFICE 2,051,326

AIR BRAKE

Charles A. Campbell, Watertown, N. Y., assignor to The New York Air Brake Company, a corporation of New Jersey Application October 8, 1931, Serial No. 567,697
Renewed June 29, 1932

77 Claims. (Cl. 303—66)

This invention relates to air brakes, and particularly to triple valves.

The invention is applicable generally to triple valves of that type which makes use of two reservoirs, an auxiliary reservoir and a supplemental reservoir, but will be described as applied to the triple valve described and claimed in my Patent No. 2,023,757 which valve is used in conjunction with a separable brake pipe vent valve. This mechanism embodies certain features relating to quick service venting which are claimed in my allowed application Serial No. 517,606, filed February 21, 1931.

The novel features herein disclosed relate to the provision of means for controlling the two-stage emergency build-up valve characteristic of my Patent No. 2,023,757 in such manner that a two-stage build-up is secured in emergency applications and also in applications in which the brake pipe pressure is reduced below the point of equalization with the auxiliary reservoir pressure, but is not secured in ordinary service applications. The device described and claimed in the prior application above identified, differs from this in that a two-stage build-up is secured in all applications provided the brake cylinder pressure reaches values in the second or slow build-up range.

Another feature of the invention is the provision of a secondary mechanism, here called a "feed-back" mechanism, whose function, generally stated, is to remain functionally inert during service applications, but to assume, in an emergency application, a position which conditions it to function prior to movement of the triple valve to release position. It also controls certain connections in emergency as well as in release after emergency, notably the connection to the supplemental reservoir.

When brake pipe pressure commences to rise after an emergency application, the feed-back mechanism moves to isolate the supplemental reservoir and connect the auxiliary reservoir and brake cylinder with the brake pipe. Equalization of the pressures in the volumes thus connected results in a pressure lower than the pressure trapped in the supplemental reservoir. Rising brake pipe pressure causes the triple valve to shift, under the urge of the graduating springs, to emergency lap position, thus interrupting also at the triple slide valve, the passage between the auxiliary and supplemental reservoirs. Consequently, when the feed-back valve resumes its normal position, the supplemental reservoir is still isolated (at the triple slide valve) from the auxiliary reservoir. When thereafter the triple valve moves to release position the supplemental and auxiliary reservoirs are again connected (through the triple slide valve) and the retained partial charge in the supplemental reservoir partially charges the auxiliary reservoir.

Generally stated, the feed-back mechanism includes a piston balanced between brake pipe pressure and the pressure in a balancing chamber. The feed-back valve mechanism is actuated primarily by such piston, and secondarily by a shiftable stop which is actuated by an abutment interposed between the brake pipe and a chamber fed from the auxiliary reservoir through a check valve.

The general principle of operation is as follows: During service reduction of brake pipe pressure, the pressure in the balancing chamber shifts the piston and thereby opens an atmospheric vent which vents the balancing chamber at a rate which is approximately the same as the service reduction rate of brake pipe pressure. During service the feed-back valve performs no other function.

Upon an emergency reduction of brake pipe pressure, the piston just mentioned moves further against a spring stop and positions the valve mechanism to vent the balancing chamber completely so that the piston is conditioned for ready movement in the reverse direction upon a predetermined rise of brake pipe pressure.

In moving as just described, during the reduction of brake pipe pressure, the piston also shifts a feed-back slide valve to connect the supplemental and auxiliary reservoirs so that they both furnish air to the brake cylinder during the emergency application. The abutment which actuates the limiting stop moves to an extreme position under the pressure opposing brake pipe pressure. When it is desired to release the brakes, the engineer starts to develop pressure in the brake pipe, which, of course, has been vented during emergency and is at atmospheric pressure. Upon development of a brake pipe pressure whose amount is controlled by a special pressure responsive valve, the piston of the feed-back mechanism moves toward the balancing chamber through its extreme travel. This travel is permitted by the abnormal position of the shiftable stop, and in the extreme position the supplemental reservoir is cut off from the auxiliary reservoir and the auxiliary reservoir is connected with the brake pipe through the chamber of the feed-back slide valve. This occurs before the triple valve moves to release position so the brake cylinder and auxiliary reservoir are then connected.

When rising brake pipe pressure and falling auxiliary reservoir pressure approach within two pounds of equalization, the abutment shifts the stop and moves the feed-back slide valve back to normal position in which the connection to the brake pipe is interrupted and connection between the two reservoirs would be restored except that it is then interrupted at the triple slide valve, which will theretofore have moved to emergency lap position.

Further rise of brake pipe pressure causes the triple valve to shift to release position and permits the supplemental reservoir to equalize with the auxiliary reservoir. After this, charging continues in the usual manner.

Subordinate features of the invention involve details in the mounting of the feed-back mechanism in such a way that it may be removed and a cover plate substituted. In such case, the normal functions of the triple valve are provided.

Another feature of the invention is the arrangement of the porting in such a manner that if the double reservoir triple valve herein disclosed becomes defective and must be removed, an ordinary standard K triple valve can, in case of necessity, be substituted, and when substituted, will cooperate with the auxiliary reservoir and brake cylinder, the connections to the supplemental reservoir and to the feed-back mechanism above outlined being blanked by the mere application of the K triple valve.

No claim is here made to the characteristic features of the triple valve described in my prior application and patent above identified and disclosed here for illustrative purposes only. Very generally stated, these features center about the so-called stabilizing port in the triple slide valve and graduating valve, the control of supplemental reservoir charging by said valves, the peculiar charging characteristics as effected by the porting of the cylinder bushing and the action of the retard stop on the graduating valve and triple piston after motion to restricted release position, the quick service limiting valve mechanism, and the two-stage emergency build-up mechanism, except as this last is herein modified to be controlled by the triple slide valve.

The preferred embodiment of the invention is illustrated in the accompanying drawings, in which,—

Fig. 1 is a plan view, partly in section, showing the emergency vent valve, triple valve, and feed-back valve, with suitable connections and manifolds, associated with an auxiliary reservoir, brake cylinder and supplemental reservoir.

Fig. 2 is a vertical axial section through the triple valve and feed-back mechanism, showing the portion of the auxiliary reservoir and the connections to the supplemental reservoir and brake cylinder. This view is diagrammatic in that the feed-back mechanism is drawn as if positioned above the triple valve and in that the ports are drawn as if they all lay in a single plane. The purpose of adopting this diagrammatic relation is, first, to conserve space by limiting the overall dimensions of the drawing, and, second, to make clear the simultaneous functions of various ports which could be located in a single plane, as shown, but which, in actual practice can be more compactly located according to principles well understood by those skilled in this art. In this view, the various valves are shown in normal release position.

Fig. 3 is a fragmentary section showing the substitution of a ported cover plate for the feed-back valve.

Fig. 4 is a view on an enlarged scale, showing the slide valve and graduating valve of the triple valve in quick service position.

Fig. 5 is a similar view, showing the parts in full service position.

Fig. 6 is a similar view showing the parts in emergency position.

Fig. 7 is a fragmentary view, showing the valve which vents the balancing chamber in service venting position.

Fig. 8 is a similar view showing the valve in emergency venting position.

Fig. 9 is a view of the main slide valve of the feed-back mechanism drawn on a slightly enlarged scale as compared to Fig. 2, and showing the valve in emergency position.

Fig. 10 is a similar view, showing the valve in emergency lap position.

Fig. 11 is a similar view, showing the valve in its extreme release position, which is the one assumed at the commencement of release following an emergency application.

Referring first to Fig. 1, a portion of the brake pipe appears at 16, and this is connected to a branch pipe T 17 with which the brake pipe communicates and from which the branch pipe 18 leads. Mounted on a ported bolting face formed on the branch pipe T 17 is an emergency brake pipe vent valve 19. This valve is of that well known type which responds only to emergency reductions of brake pipe pressure to vent the brake pipe directly to atmosphere. Interposed in the branch pipe 18 in the order stated are a cut-out cock 21 and a centrifugal dirt collector 22.

The branch pipe 18 is connected at 23 in the usual manner (see Fig. 2) with a triple valve which is indicated generally in Fig. 1 by the numeral 24 applied to the valve body. The triple valve is mounted on a ported filler piece 25 which is supported directly on the rear end of the auxiliary reservoir 26. The triple valve communicates through the filler piece 25, as will be hereinafter more fully explained, with a brake cylinder pipe 30 which extends through the auxiliary reservoir 26 and communicates with the rear end of the brake cylinder a portion of which is indicated at 28.

The supplemental or emergency reservoir 27 communicates through a pipe 29 and fitting 31 with a port in the filler piece 25. In case it is desired to mount the supplemental reservoir 27 on the other side of the auxiliary reservoir 26, the closure cap 32 is removed and interchanged with the fitting 31. The filler piece 25 is so ported that the same operative flow connections are made under either condition.

The feed-back valve is indicated by the numeral 33 applied to its body. It should be explained that in actual construction the three ball-check valves, which will be described with reference to Fig. 2, are preferably mounted on the filler piece 25 instead of in the body of the feed-back valve, as indicated in Fig. 2. This is a matter of convenience, and as no claims are directed to this feature in the present application, it is deemed unnecessary to elaborate this structure, but to avoid misunderstanding, it may be said that the members 34, 35, and 36 are threaded closures which overlie the check valves in question. Two of these closures appear in the diagrammatic Fig. 2 and are there identified by the reference numerals 34 and 35.

It may be explained that the triple valve about to be described is devoid of any mechanism for venting the brake pipe to atmosphere, and it is for that reason that a separate emergency brake pipe vent valve 19 is used. It is familiar practice to incorporate the emergency vent and its function in triple valves, and where this construction is used a separate vent valve is unnecessary. A separate vent valve is preferred because it will respond irrespective of the response of the triple valve, and because it gives far more rapid action than can be had with the other arrangement. Both arrangements are common in the art and by illustrating one I do not mean to limit the scope of my invention in this respect.

Referring now to Fig. 2, the construction of the triple valve will first be described. The body 24 has the usual valve chamber bushing 37 formed in its lower portion with a seat for the slide valve 38. There is also a cylinder bushing 39 provided with drilled-through charging ports, indicated at 41, so located as to be controlled by the triple piston 42. The exact construction of these ports is immaterial to the present invention, but it may be mentioned that they control the reduction of the charging rate when the piston moves to its innermost or restricted recharge position.

The piston 42 has the usual rod or stem 43 which is provided with a shoulder 44 and a spider 45 between which the slide valve 38 has lost motion. The graduating valve 46 rides on the top of the slide valve 38 and is closely confined in a notch in the stem 43.

At the inner or reservoir end of the valve bushing 37 is a ported guide 47 for a retard stop plunger 48 which is urged to the left by the usual retard stop spring 49. The retard stop 48 coacts with the end of the stem 43 and the parts are so arranged that when the piston 42 overpowers the spring 49, both the valves 38 and 46 move inward. When the spring 49 returns the piston 42, the slide valve 38 remains in its inner position and only the graduating valve 46 moves outward.

Bolted to the body 24 is the usual front cap 51. The joint is sealed by the usual gasket 52 which also serves as a seat for the piston 42. Mounted in the front cap is the graduating stem 53 which is urged forward by a light graduating spring 54. The forward motion is limited by collar 55. After the stem 53 has been forced back slightly, the collar 55 collides with a flange on ring 56 and further motion is resisted by a second and heavier graduating spring 57.

When the button 58 on piston 42 first engages stem 53, the triple valve is in quick service position. When the flange 55 engages the ring 56, the valve is in full service position, and when the piston 42 overpowers both springs and seats against gasket 52, the valve is in emergency position. This last position is assumed also if brake pipe pressure is reduced gradually below the point of equalization with auxiliary reservoir pressure.

When the stem 43 engages retard stop 48 without compressing spring 49, the valve is in normal release and recharge position. At its right hand limit of motion, after overpowering spring 49, the valve is in restricted recharge and release position.

Bolted to the lower side of body 24 and sealed by an interposed gasket 59 is the lower case 61. It is to this case that the branch pipe is connected, as indicated at 23. Mounted in a recess formed partly in the body 24 and partly in the lower case 61, is a cage 62 for the quick service limiting valve. This cage is sealed partly by the gasket 59 and partly by the gaskets 63 and 64.

The brake cylinder pipe 30 communicates by way of a passage 65 formed partly in the body 24 and partly in the filler piece 25 with an annular space 66 surrounding the cage 62. Mounted within the cage 62 and sealed thereto by a gasket 67 is a ported cup-shaped diaphragm mount and valve seat member 68. Clamped to the lower portion of the valve seat member as clearly shown in the drawings, is a diaphragm 69. The diaphragm clamping ring is shown at 71 and the clamping nut at 72. The nut is ported to permit the passage of air under pressure to the lower side of the diaphragm.

Mounted on a hub 73 clamped to the center of the diaphragm is a laterally shiftable pin valve 74 which coacts with a seat 75. A loading spring 70 urges the diaphragm downward and establishes the desired pressure differential which will cause the opening of the pin valve. This diaphragm valve controls the flow of brake pipe air to the brake cylinder during quick service and prevents such flow from occurring after brake pipe pressure has been reduced a certain amount from its normal value.

Below the mechanism just described, the lower case 61 is bored out in opposite directions to receive the two parts of the delay build-up mechanism. The two chambers are separated by a partition 76 which has a central aperture. Inserted to the right of this partition is a bushing 77 which seats at its left end on a gasket 78. This bushing is ported at its left end and such port opening is provided with a rim 79 serving as a valve seat. The bushing 77 is held in place by a cap nut 81 which seats on the periphery of a ported cup-like spring seat 82 and forces this against a gasket 83 which in turn seats on the outer end of bushing 77. In this way the cap holds the bushing in place and seals it against leakage at both ends.

Slidably mounted in the bushing is a cup-like piston member 84 which is urged inward by a spring 85 compressed between the piston and the spring seat 82. This piston has a gasket 86 which seats against the seat 79 and on its initial outward motion it blanks a port 87 which forms part of a communication from the annular space outside the seat 79 to the space to the right of the piston.

As will be explained, the piston is subject on its left hand end to brake cylinder pressure acting on the area within the seat 79. The space outside the seat 79 is vented through the port 87.

As soon as the piston 84 starts to the right, port 87 is blanked and the entire left hand end of the piston 84 is subjected to brake cylinder pressure. This increase in area causes the piston to move suddenly to the right as soon as it starts away from the seat 79, and in its right hand position it seals against the gasket 83. Since it moves from gasket 86 suddenly to gasket 83, the piston 84 need make only a good sliding fit in the bushing.

Inserted through the other one of the two bores just mentioned is a cup-like bushing 88 having a hub member 89 which extends through the opening in the partition 76. The hub 89 has ports 91 which communicate with a space to the left of the partition 76 and the hub serves as a guide for the stem 92 of a valve 93 which coacts with the seat 94.

The bushing 88 is held in place by a threaded plug 95 which forces it against a gasket 96. When the piston 84 is in its left hand position, it engages the end of the stem 92 and holds the valve 93 open. When the piston 84 moves to the right, it allows the valve 93 to close under the urge of a light spring 97 and at that time flow past the valve 93 is limited to the capacity of the small choke 98 which communicates with the through port 99.

The triple valve body and lower case are ported as follows: There are two ports 101 and 102 which lead from the space 66 to the spaces on opposite sides of the partition 76. Port 101 admits brake cylinder air to act on piston 84 undisturbed by flow to the brake cylinder. 102 is the port through which flow to the brake cylinder occurs.

Leading from the chamber 103 within the upper end of the cage 62 is a port 104 which leads to the space at the left of the valve seat 94. Both the service and emergency ports of the triple valve lead directly to the space 103 so that flow to the brake cylinder is by way of space 103, port 104, past valve 93, and then by way of port 102 to passage 65 and brake cylinder pipe 30. The flow is free when valve 93 is open and is restricted to the capacity of choke 98 when valve 93 is closed. The closing of the valve initiates the second or slow build-up stage of emergency.

The brake pipe is connected by passage 105 to the space at the left of the triple piston 42 and by passage 106 with the space above the diaphragm 69. From this space flow is past the valve seat 75 to a passage 107 which is formed partly in the cage 62 and partly in the members 24 and 61 and terminates in the valve seat. This port serves for quick service flow from the brake pipe to the brake cylinder and for stabilizing flow from the auxiliary reservoir to the brake pipe, as will be hereinafter explained.

There is a port 108 which leads from the brake pipe connection both to a drip cup 109 and also to a brake pipe passage formed in the filler piece 25. There is a passage 112 leading from the supplemental reservoir connection 31 on the filler piece 25 to the space below the diaphragm 69. Thus the lower side of the diaphragm is at all times subject to supplemental reservoir pressure.

Referring now to Figs. 4, 5 and 6, the porting of the triple slide valve and graduating valve will be described. In addition to the quick service and stabilizing port 107 already mentioned, there is a quick service port 113 which leads to the brake cylinder chamber 66. There is an exhaust port 114 which leads to atmosphere by way of passage 115 and retainer pipe 116. A retainer valve may be used, but is not illustrated.

There are two ports leading to the space 103, that indicated at 117 being provided for service and emergency flow to the brake cylinder under control of the delay build-up valve, and that illustrated at 118 being the port through which exhaust flow from the brake cylinder to atmosphere occurs. It will be observed that the valve 93 is in effect a check valve and that the spring 97 is light so that the valve 93 does not interfere with free exhaust.

There is a port 119 which is the port through which charging flow to the supplemental reservoir occurs. This port leads to a valve seat in the feed-back valve, as will be hereinafter explained.

There is a port 121 which leads to the space to the right of the piston 84. There is an independent exhaust port 122 which is not controlled by the retaining valve, if a retaining valve be used.

The slide valve and graduating valve are ported as follows: The stabilizing port 123 registers with port 107 when the triple piston 42 moves inward against the retard stop to its innermost (restricted release and recharge) position. In this position it is blanked by the graduating valve 46, but when the retard stop forces the piston 42 outward, a port 124 in the graduating valve registers with the upper end of port 123, allowing stabilizing flow from the auxiliary reservoir back to the brake pipe. As explained in my prior application this occurs only at the forward end of the train on those valves which move to restricted release position, and stabilizes against undesired reapplication those valves which are most likely to be effected by an erratic feed valve.

In the slide valve 38 are two quick service ports 125 and 126 which, in quick service position, register with the ports 107 and 113 and are then connected by a recess 127 in the graduating valve 46. The main exhaust port 128 bridges ports 114 and 118 in normal release. In restricted release port 128 registers with port 118, and a restricted extension 129 which leads from port 128 registers with exhaust port 114.

Supplemental reservoir charging port 131 in slide valve 38 registers with port 119 in both normal and restricted release positions, and in these positions its upper end registers with port 132 through the graduating valve 46. The service port 133 is controlled at its upper end by the graduating valve 46 and has two branches 134 and 135. 134 partially registers with port 117 in quick service and fully registers in full service position. Branch 135 fully registers with port 121 in quick service and partially registers with it in full service.

A loop port 136 in the slide valve 38 is functionless in all positions except emergency position, at which time it connects port 121 with the independent exhaust port 122. The ports 121, 122, and 136 involve a feature of novelty over the valve described in my prior application. It will be observed that as shown in Figs. 4 and 5 port 135 admits brake cylinder pressure against the right side of piston 84 in all service applications. It follows that valve 93 is held open so that there can be no delay of the build-up of brake cylinder pressure during a service application.

When the valve moves to emergency position (see Fig. 6), then the port 121 is connected to the port 122 and the space to the right of the piston 84 is vented to atmosphere. Consequently, when brake cylinder pressure communicated through passage 101 builds up sufficiently to overpower spring 85, the piston 84 moves suddenly to its outer limit of motion allowing valve 93 to close. Thereafter brake cylinder flow will be checked at the choke 98 so that brake cylinder pressure will rise gradually to its final value. This action also takes place if brake pipe pressure is slowly reduced a substantial amount below the point of equalization with auxiliary reservoir pressure.

The emergency port in slide valve 38 is indicated at 137. It is not controlled by the graduating valve 46 and its sole function is to register with port 117 in emergency position (see Fig. 6). This connects the slide valve chamber with chamber 103, and consequently with the brake cylinder.

Formed in the filler piece 25 are a so-called balancing chamber 141, a continuation 142 of the port 119, and a port 143 which leads from the auxiliary reservoir by way of a loop 144 formed in the flange of triple valve body 24. The purpose of this loop is to insure interruption of the passage 143 if an ordinary K-type triple valve be substituted for that shown in the drawings.

Formed in the body 25 is a passage 145 which leads from the supplemental reservoir connection 31, and a passage 146 which communicates with the brake pipe passage 108. These ports all terminate in a mounting face against which, with an intervening gasket 147, is mounted the lower body 148 of the feed-back valve. The upper body 33 is mounted on the lower body 148 with an intervening ported gasket 149.

Mounted in the lower body 148 is a valve chamber bushing 151. This is formed with an exhaust port 152 which leads to atmosphere through a choke 153. This port is controlled by a slide valve 154 having a rather small leak port 155 (see Figs. 7 and 8). The valve is closely confined between the collars 156 on piston rod 157. This rod is guided at its inner end, as indicated at 158, and its outer end carries a piston 159 working in bushing 161.

There is a front cap 162 which is sealed to the body 148 by a gasket 163, the gasket serving as a seat for the piston 159. There is a graduating stop 164 and a graduating spring 165 so positioned as to arrest piston 159 when port 155 registers with port 152. This position is assumed in service.

The space to the right of the piston 159 is open to the balancing chamber 141 as shown. Mounted in the upper body 33 is a valve chamber bushing 166 for a slide valve 167. This slide valve is actuated by the piston 159 through a lever 168 pivoted at 169. The upper end of the lever has a close fitting ball connection with the valve 167. The lower end of the lever 168 is forked to straddle stem 157, and has lost motion between the collars 156 so that the piston 159 may move a limited amount without moving the valve 167.

Mounted at the outer or left hand end of the upper body 33 is a diaphragm 171 with somewhat larger effective area than the piston 159. This diaphragm is held in place by a front cap 172 bolted to the body 33.

Clamped to the center of the diaphragm are two plates 174 and 175 which by collision with portions of the body 33 and front cap 172 limit the motion of the diaphragm. Plate 175 is provided with an annular extension 176 which enters the bushing 166 and serves as a limiting stop for the leftward motion of the valve 167. It is in thrust relation with the valve 167, but is not connected therewith.

The diaphragm is guided by a stem 177 which works in the guideway in the cap 172 and the diaphragm is urged to the right by a coiled compression spring 178 which will resist a differential acting on the diaphragm of approximately two pounds per square inch.

In Fig. 2 the piston 159 is shown in its normal running position in which the lever 168 is against the left hand collar 156, and the slide valve 154 blanks the exhaust port 152. At such time the piston exposes charging port 179 which leads upward past the check valve 181 to a passage 182 which leads through the space around lever 168 to the balancing chamber 141.

There is also a branch passage through the check valve 183 to a port 184 in valve bushing 166 (see Figs. 9 to 11). The space to the left of both the diaphragm 171 and the piston 159 is subject to brake pipe pressure conducted through passages 108 and 146 and ports 185 and 186, respectively.

As an optional feature I show the use of a pressure responsive valve, controlling port 185, and called for lack of a better name an inhibiting mechanism. This is arranged to open when brake pipe pressure reaches a definite value, chosen for example as 25 pounds per square inch, and to remain open until pressure again falls below such definite value.

The purpose in using such inhibiting mechanism is to correct two conditions which arise when feed back triple valves of the type here disclosed are mixed in trains with ordinary triple valves, for example, standard K triple valves.

The first condition arises during emergency applications. The feed back triple valve here disclosed is used in conjunction with an emergency vent valve 19, which vents the brake pipe to atmosphere in emergency, whereas the K triple valve vents the brake pipe to brake cylinder in emergency. From this it follows that during emergency reductions of brake pipe pressure the vent valves 19 associated with the feed back triple valves and the quick action mechanisms of the K triple valve tend to produce in the brake pipe two different brake pipe pressures so that when the two types of equipment are connected in a single train, and particularly where the two different types happen to be arranged in groups, active pressure surges will be created in the brake pipe during an emergency reduction of brake pipe pressure. These surges are at rather low pressures, say below 25 pounds per square inch, but they are occasionally sufficient, in the absence of the inhibiting mechanism, to cause certain feed back valves to move to feed back position with objectionable results. The inhibiting mechanism is for the purpose of preventing harmful response of the feed back mechanism to such pressure surges, and in the embodiment here illustrated functions to isolate the feed back valve piston 159 from the brake pipe when brake pipe pressure falls below a low value, say the 25 pound limit above suggested.

The second condition arises in release following emergency. The K triple valve has no feed back function and if a considerable number of K triple valves are connected in a train with feed back triple valves, and particularly if the K triple valves are connected in a group, the K triple valves may function to absorb so much air from the brake pipe during release after emergency as to impair the feed back response of feed back triple valves which are located at the rear of the train beyond the group of K triple valves. The effect of such absorption of air by the K triple valves is to cause brake pipe pressure to rise very slowly to the rear of the group of K triple valves. Consequently the pistons 159 of the feed back valves at the rear of the train move toward feed back position so slowly that they may come to rest as soon as they expose their feed ports 179, and thereafter fail to move to feed back position. By inhibiting the response of the feed back pistons until brake pipe pressure has risen a substantial amount, say the 25 pounds above suggested, full stroke motion of the feed back pistons to feed back position is ensured.

In the preferred embodiment here illustrated this result is secured by protecting the feed back piston 159 from brake pipe pressure until brake pipe pressure has risen a substantial amount, at which time the feed back piston is suddenly subjected to brake pipe pressure and caused to move full stroke.

Thus the inhibiting mechanism performs two functions. It protects the feed back piston against response to brake pipe pressure surges during emergency reductions. It ensures the operation of the feed back mechanism to feed back position during release after emergency. Its use is considered necessary only during the transition period when considerable numbers of K triple valves are likely to be present in trains. Its use at other times is not objectionable.

Generally stated, without the inhibiting mechanism the operation of the feed back valve is dependent on a fairly rapid rate of rise of brake pipe pressure during release following emergency. With the inhibiting mechanism the feed back device is rendered wholly independent of the rate of rise and is caused to respond certainly to a definite degree of rise without regard to the rate at which such rise occurs.

The port 185 is shown leading through a valve seat 201 formed at the inner end of cylinder bushing 202, which is sealed in a recess in cap 162 by means of gasket 203, spring seat 204 and screw plug 205. The spring seat 204 is ported at 206 and the plug 205 is ported to atmosphere at 207 so that the interior of bushing 202 is vented to atmosphere at its lower end.

A cup-shaped piston 208 works in cylinder bushing 202 and is urged toward seat 201 by a spring 209 which will resist about 25 pounds per square inch gage acting on the area within seat 201. The piston carries at its upper end a gasket to seal against seat 201, and at its lower end has a narrow rim which seats on gasket 203 in the outer position of the piston. At such time the piston closes communication between port 211 in bushing 201 and atmosphere. Port 211 is connected by passage 212 with that part of passage 185 which leads to the space at the left of piston 159.

The function of port 211 is to vent the space to the left of piston 159 and ensure complete venting of balancing chamber 141, after piston 208 has moved upward closing port 185.

By omitting port 211, piston 159 can be caused to move to the right and close port 152 before chamber 141 is completely vented. If this construction be used, brake pipe pressure must rise above the pressure retained in chamber 141 before the feed back action can take place. Complete venting of chamber 141 is not essential, but is preferred because it causes the action of the feed back valve to be more prompt and certain.

The parts 201–212 are needed only during a transition period when valves are to be used in mixed equipment trains. To eliminate the valve and its function the piston 208 is removed and ports 207 are plugged, or a new cap 162, lacking the unnecessary parts, may be substituted, as will be obvious.

Auxiliary reservoir passages 143, already described as formed in the filler piece 25, extends past a check valve 187 to the space within the bushing 166 so that the pressure acting on the right side of diaphragm 171 is never less than auxiliary reservoir pressure.

The passage 143 also has a branch terminating in the port 188 in seat bushing 166. A branch from the brake pipe passage 146 leads to a port 189 in valve bushing 166. The supplemental reservoir charging port 142, described as formed in filler piece 25, has an extension which terminates in the port 191 in bushing 166. Supplemental reservoir passage 145 terminates in an adjacent port 192. This port has a second branch 193, the purpose being to insure connection of the supplemental and auxiliary reservoirs in both emergency position and emergency lap position (see Figs. 9 and 10).

The slide valve 167 is provided with a recess 190 which, in the normal running position of Fig. 2, connects ports 191 and 192. In emergency position (Fig. 9) it connects ports 188 and 193. In emergency lap position (Fig. 10) it connects ports 192 and 188, and in the innermost release position after emergency it moves clear of all four of said ports so that they are all blanked by the slide valve 167 (Fig. 11).

At times it may be necessary to remove the feed-back valve either because of failure to function or for other reasons. In such case, a cap 195 is mounted against the gasket 147. This cap 195 has a loop port 196 which connects the ports 142 and 145 and blanks the ports 143 and 146. Thus the auxiliary reservoir and brake pipe ports are blanked by the cap 195 and the supplemental reservoir port is connected to the supplemental reservoir charging port so that charging of the supplemental reservoir may be controlled directly by the triple slide valve and graduating valve, and so that flow from the supplemental reservoir to the brake cylinder may occur in emergency.

If it should be necessary to substitute an ordinary K triple valve on the filler piece 25 in lieu of the double reservoir triple valve shown, this can be done. The standard K triple valve, if substituted, would be connected to the auxiliary reservoir and brake cylinder pipe, for the reason that standard K valve mounting dimensions are followed. At the same time, the flange would blank the ports 146, 145, and 142 directly and would blank the port 143 because the flange of the K-type triple lacks the loop port 144.

Thus, without changing any pipe connections and without even removing the feed-back valve, the K-type triple valve may be substituted, and when substituted, will operate in its usual manner. This is a very important feature during the period of transition from the use of the present standard K triple valve to valves of the type herein disclosed.

OPERATION

*Normal recharge and release*

Assuming a gradual rise of brake pipe pressure, air entering the triple valve at 23, flows to the spaces at the left of piston 42, and at the left of diaphragm 171. As soon as brake pipe pressure rises sufficiently to overpower spring 209 piston 208 shifts outward and remains in its outermost position until an emergency application is made. Shifting of piston 208 allows air to flow to the space to the left of piston 159.

Piston 42 moves until arrested by retard stop 46. As chamber 166 still retains its original charge (held by check valve 187) diaphragm 171 will remain at the left until the overtravel of valve 167, under the urge of piston 159, opens port 189 and dissipates the excess to the brake pipe. Then the diaphragm will shift valve 167 to normal position (Fig. 2). Diaphragm 171 is larger than piston 159 and hence dominates.

With the parts thus normally positioned, air flows through charging ports 41, past triple piston 42, to the slide valve chamber. From there it flows directly to the auxiliary reservoir, and to the supplemental reservoir by ports 132, 131, 119, 142, 191, 190, 192, 145 to connection 31. The brake cylinder is exhausted by way of ports 65, 66, 102, 104, 103, 118, 128, 114.

Brake pipe air flows through charging port 179, check 181 and port 182 to balancing chamber 141.

Restricted release and recharge

On cars at the head of the train, the rapid rise of brake pipe pressure causes piston 42 to overpower retard spring 49. The piston moves in and ports 41 restrict the charging flow to both reservoirs. The slide valve 38 moves in until port 123 registers with port 107, but is blanked by graduating valve 46. Brake cylinder exhaust is restricted at 129.

The feed-back valve portion is charged as already described, with the exception that part of the air passing through port 179 branches off through check 183 and port 184 to the chamber within bushing 166 to ensure that valve 167 will not be forced from its seat. As this flow builds pressure up faster than the pressure rise in the auxiliary reservoir, check valve 187 does not open. The chamber in bushing 166 retains its original charge, but the excess will be dissipated, as already explained. If the chamber in bushing 166 should thereafter become overcharged, its overcharge will be retained until the next ensuing release.

Normal recharge after restricted recharge and release

When pressure in the slide valve chamber 37 is within two pounds of brake pipe pressure, spring 49 will shift piston 42 outward so that port 124 registers with stabilizing port 123. The establishment of this additional communication between auxiliary reservoir and brake pipe stabilizes the triple valve against motion induced by an erratic feed valve or similar causes. If chamber 141 is overcharged, piston 159 will move out until arrested in service position by stop 164 and port 155 will dissipate the overcharge, whereupon piston 159 will move in slightly. Valve 167 remains unaffected.

Quick service (see Figs. 4 and 7)

A light reduction of brake pipe pressure causes piston 42 to move outward closing feed ports 41 and shifting valve 46 on valve 38 and then shifting both valves to establish the quick-service venting communication 107, 125, 127, 126, 113. Venting from brake pipe to brake cylinder may continue until brake pipe pressure falls low enough to shift valve 38 further, or until valve 74 closes because of the differential between brake pipe pressure and supplemental reservoir pressure. (The supplemental reservoir is not drawn upon in service).

Service ports 134 and 117 are partially opened so that air starts to flow to the brake cylinder. Service port 135 registers with port 121 so piston 84 is subjected to pressure and held to its seat 79. Thus stage build-up valve 93 cannot close.

Piston 159 moves to the left to spring stop 164. There it stops while port 155 vents air from chamber 141 at a service rate. Valve 167 remains at rest.

Full service (Figs. 5 and 7)

To reach this position, piston 42 overpowers the first graduating spring 54 and is arrested by the second spring 57. Ports 134 and 117 are in full register, and ports 135 and 121 are in partial register. Quick service port 125 is out of register with port 107. Otherwise, the parts function as in quick service.

Emergency (Figs. 6, 8, 9 and 10)

When a sudden reduction of brake pipe pressure causes vent valve 19 to function, brake pipe pressure drops to atmospheric. Pistons 42 and 159 and diaphragm 171 move to their extreme left hand positions. Supplemental reservoir 27 is connected with auxiliary reservoir 26 by ports 144, 143, 188, 190, 193, 192, 145, and the auxiliary reservoir is connected to the brake cylinder by way of ports 137, 117, chamber 103, ports 104, 102, 65 and pipe 30. The space to the right of piston 84 is vented to atmosphere via ports 121, 136, 122. Hence, when brake cylinder pressure reaches an amount sufficient to start piston 84 to the right (about fifteen pounds per square inch), valve 93 closes and flow is restricted to the capacity of choke 98.

Piston 159 overpowers spring stop 164, 165, shifting the valve to the position shown in Fig. 9, and valve 154 to the position shown in Fig. 8. This last opens port 152 wide and pressure in chamber 141 falls to atmospheric. Then spring 165 shifts piston 159 inward and valve 167 assumes the position shown in Fig. 10, in which the reservoirs are still connected by way of ports 192, 190, 188. Thus the shift does not change the connections but does put valve 154 in the position shown in Figure 7.

Diaphragm 171 is held in its extreme left hand position by pressure trapped in the chamber within bushing 166. The fall of brake pipe pressure causes piston 208 to move up isolating piston 159 from the brake pipe, and venting the space at the left of the piston to atmosphere.

Release and recharge after emergency

The brake pipe and connected chambers are at or near atmospheric pressure after an emergency application, and the reservoirs and brake cylinder pressures will have equalized at say 60 pounds. Chamber 141 is at atmospheric pressure. The space within bushing 166 is at normal auxiliary reservoir pressure, say 70 pounds. If then the engineer admits pressure to the brake pipe, piston 208 (if used) will isolate piston 159 until a pressure, assumed to be 25 pounds, is attained in the brake pipe. When piston 208 moves downward brake pipe pressure acts on and shifts piston 159 to the right. Since stop 176 is to the left, piston 159 moves its full travel to the right so that valve 167 moves to its extreme left position (Fig. 11). This exposes port 189, so air flows from auxiliary reservoir 26 past check valve 187 to port 189 and thus to brake pipe. At this time the brake cylinder and auxiliary reservoir are connected through the triple valve which remains in emergency position. Ports 188, 192 and 193 are blanked (see Fig. 11) so the supplemental reservoir is isolated. Shortly thereafter the triple valve will move to emergency lap position.

When brake pipe pressure rises to within two pounds of auxiliary reservoir pressure, spring 178 shifts diaphragm 171 and stop 176 to the right, and shifts valve 167 to the position shown in Fig. 2. This blanks port 189, stopping flow to the brake pipe. Ports 191 and 192 are at such time connected by recess 190, but as piston 42 has previously moved to emergency lap position, supplemental reservoir pressure cannot equalize with auxiliary reservoir pressure.

On further rise of brake pipe pressure, the triple valve will shift from emergency lap position to release and recharge position, in which position charging is completed in the manner already outlined under normal recharge and release.

*Over-reduction position*

Standard K-type triple valves will not vent the brake pipe where a service application precedes an emergency reduction. Thus where K valves are mixed in a train with valves according to the present invention, the vent valves 19 may not function and then the slide valves can reach the position of Fig. 6 only by a slow brake pipe reduction carried beyond the point of equalization. When this happens piston 159 moves only to service position where it is arrested by stop 164, so valve 167 remains in the position of Fig. 2. It is important to observe that in this position port 190 connects ports 191 and 192, so that supplemental reservoir air can flow to port 119 via ports 192, 190, 191 and from port 119 through ports 134 and 133 to the slide valve chamber. Consequently supplemental reservoir air is drawn upon under these circumstances.

*Release after over-reduction*

The space within bushing 166 is at normal auxiliary reservoir pressure, say 70 pounds. The auxiliary and supplemental reservoirs and the brake pipe are all equalized at say 60 pounds. If then the engineer admits pressure to the brake pipe, the piston 159 will be moved to the right. The stop 176 being to the left under the differential between the pressure in chamber 166 and brake pipe pressure, allows slide valve 167 to move to its extreme left-hand position, opening port 186 to the chamber within bushing 166 and allowing pressure in this chamber to flow into the brake pipe. Thereafter auxiliary reservoir pressure, which is at this time higher than brake pipe pressure, will flow through passage 143, past ball check 187 into the chamber within bushing 166 and through port 186 to the brake pipe until brake pipe pressure has been raised and auxiliary reservoir pressure reduced to the point at which spring 178 returns the stop 176 and the valve 167 to their normal positions.

The construction and details of operation above set forth, and particularly such details as pressures, strengths of springs, and the like, are illustrative and not limiting, except as expressly introduced as limitations in claims. Various modifications of structure and arrangement are possible, and some have been expressly suggested.

What is claimed is:—

1. The combination with a triple valve having a service position and an emergency position in each of which air flows through a passage to a brake cylinder, of a build-up valve controlling said passage and operable to vary the rate of flow therethrough; a pressure motor for actuating said build-up valve; and valve means operated directly by the triple valve piston and effective in service position and in emergency position to impart relatively diverse operative characteristics to said motor in said two positions.

2. The combination with a triple valve having a service position and an emergency position in each of which air flows through a passage to a brake cylinder, of a build-up valve controlling said passage and operable to vary the rate of flow therethrough; and a pressure motor for actuating said build-up valve, the slide valve forming part of said triple valve being provided with ports effective in service and in emergency positions to impart relatively diverse operative characteristics to said motor in said two positions.

3. The combination with a triple valve having a service position and an emergency position in each of which air flows through a passage to a brake cylinder, of a build-up valve controlling said passage to vary the rate of flow therethrough; and a spring-loaded piston urging said valve in one direction and subject in the opposite direction to brake cylinder pressure; there being ports in said triple valve serving in service position to cause one pressure and in emergency position to cause another pressure to act on said piston in opposition to brake cylinder pressure.

4. The combination with a triple valve having a service position and an emergency position in each of which air flows through a passage to a brake cylinder, of a build-up valve controlling said passage to vary the rate of flow therethrough; and a spring-loaded piston urging said valve in an opening direction and subject in a valve-closing direction to brake cylinder pressure; there being ports in said triple valve serving in service position to cause a relatively high pressure and in emergency position to cause a relatively low pressure to act on said piston in a valve-opening direction.

5. The combination of claim 4, further characterized in that said piston seals against an annular seat when in the position in which it holds the built-up valve fully open, said seat then serving to reduce the effective area of the piston, said effective area being restored upon initial motion of the piston in a valve-closing direction.

6. The combination of claim 4, further characterized in that the relatively high pressure is brake cylinder pressure and the relatively low pressure is atmospheric pressure.

7. The combination with a brake system including a triple valve, auxiliary reservoir, brake pipe, and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and the brake pipe and shiftable to a position in which the by-pass connection is opened by extreme motion of the piston toward the balancing chamber; a shiftable stop normally effective to prevent motion of said valve means to the last named position; and means responsive, in part at least, to brake pipe pressure and serving upon reduction thereof to shift said stop to an ineffective position.

8. The combination with a brake system including a triple valve, auxiliary reservoir, brake pipe, and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and the brake pipe and shiftable to a position in which the by-pass connection is opened by extreme motion of the piston toward the balancing chamber; a shiftable stop normally effective to prevent motion of said valve means to the last named position; and means responsive, at least in part, to brake pipe pressure and serving upon reduction thereof to shift said stop to an ineffective position, and upon substantial restoration of brake pipe pressure serving to restore said stop and valve means to their normal positions.

9. The combination with a brake system including a triple valve, auxiliary reservoir, brake pipe, and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and the brake pipe and shiftable to a position in which the by-pass connection is opened when the piston moves toward the vented balancing chamber under rising brake pipe pressure; and means subject to the differential between brake pipe pressure and auxiliary reservoir pressure and serving upon approach to equalization thereof to shift the last-named valve means to normal position.

10. The combination with a brake system including a triple valve, auxiliary reservoir, brake pipe, and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and the brake pipe and shiftable to a position in which the by-pass connection is opened when the piston moves toward the vented balancing chamber under rising brake pipe pressure; a shiftable stop in thrust relation with said valve means; and a diaphragm connected to actuate said stop and subject in one direction to auxiliary reservoir pressure and in the opposite direction to brake pipe pressure.

11. The combination with a brake system including a triple valve, auxiliary reservoir, brake pipe, and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and the brake pipe and shiftable to a position in which the by-pass connection is opened when the piston moves toward the vented balancing chamber under rising brake pipe pressure; a shiftable stop in thrust relation with said valve means; a diaphragm connected to actuate said stop and subject in one direction to auxiliary reservoir pressure and in the opposite direction to brake pipe pressure; and a loading spring acting on said stop in the same direction as brake pipe pressure.

12. The combination with a brake system including a triple valve, auxiliary reservoir, supplemental reservoir, brake pipe, and brake cylinder, of a balancing chamber; a piston interposed between the brake pipe and balancing chamber and controlling charging flow from the brake pipe to said chamber; venting means actuated by said piston to vent said chamber at a service rate when brake pipe pressure is reduced at a service rate and to vent said chamber completely when brake pipe pressure is reduced at an emergency rate; and valve means actuated by said piston, normally closing a by-pass connection between the auxiliary reservoir and brake pipe, shiftable to a position in which said by-pass connection is opened by extreme motion of the piston toward the balancing chamber, and serving when said piston is in emergency position, to connect said supplemental and auxiliary reservoirs; a shiftable stop normally effective to prevent motion of said valve means to its extreme position toward the balancing chamber; and means responsive, in part at least, to brake pipe pressure, and serving upon reduction thereof to shift said stop to an ineffective position.

13. The combination with a brake system including a triple valve, auxiliary reservoir, supplemental reservoir, brake pipe, and brake cylinder, of a balancing chamber; a piston interposed between the brake pipe and balancing chamber and controlling charging flow from the brake pipe to said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and brake pipe, shiftable to a position in which said by-pass connection is opened when the piston moves toward the vented balancing chamber under rising brake pipe pressure, and serving in emergency position to connect said supplemental and auxiliary reservoirs; and means responsive to the pressure differential between brake pipe and auxiliary reservoir and serving upon approach to equalization thereof to restore said valve means to normal position prior to motion of the triple valve to release position.

14. The combination with a brake system including a triple valve, auxiliary reservoir, supplemental reservoir, brake pipe, and brake cylinder, of a balancing chamber; a piston interposed between the brake pipe and balancing chamber and controlling charging flow from the brake pipe to said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and brake pipe, shiftable to a position in which said by-pass connection is opened when the piston moves toward the vented balancing chamber under rising brake pipe pressure, and serving in emergency position to connect said supplemental and auxiliary reservoirs; and means responsive to the pressure differential between brake pipe and auxiliary reservoir and serving upon approach to equalization thereof to shift the last-named valve means to normal position.

15. The combination with a brake system including a triple valve, auxiliary reservoir, supplemental reservoir, brake pipe, and brake cylinder, of a balancing chamber; a piston interposed between the brake pipe and balancing chamber and controlling charging flow from the brake pipe to said chamber; venting means for said chamber actuated by said piston to limit the response of the piston to service rate reductions of brake pipe pressure, and to vent the chamber when the piston has responded to an emergency reduction of brake pipe pressure valve means actuated by said piston, normally closing a by-pass connection between the auxiliary reservoir and brake pipe, shiftable to a position in which said by-pass connection is opened when the piston moves toward the vented balancing chamber under rising brake pipe pressure, and serving in emergency position to connect said supplemental and auxiliary reservoirs; a shiftable stop in thrust relation with the last-named valve means; a diaphragm larger than said piston interposed between brake pipe and auxiliary reservoir pressures; and a loading spring acting on said stop in the direction of brake pipe pressure.

16. The combination of claim 7 further characterized in that the venting means for the balancing chamber comprises a valve positively connected with said piston and the valve means controlling the by-pass connection comprises a slide valve having a lost motion connection with said piston.

17. The combination of claim 11 further characterized in that the venting means comprises a slide valve having a positive connection with said piston and the valve means controlling the by-pass connection comprises a slide valve having a lost motion connection with said piston.

18. The combination of claim 11 further characterized in that the venting means comprises a slide valve positively actuated by said piston and the valve means controlling the by-pass connection comprises a slide valve having a lost motion connection with said piston, the second-named slide valve being located in a chamber isolated from said balancing chamber and fed from the auxiliary reservoir through a check valve.

19. The combination of claim 11 further characterized in that the venting means comprises a slide valve positively actuated by said piston and the valve means controlling the by-pass connection comprises a slide valve having a lost motion connection with said piston, the second-named slide valve being located in a chamber isolated from said balancing chamber and fed from the auxiliary reservoir through a check valve, the diaphragm being subjected to auxiliary reservoir pressure arriving through the valve chamber just mentioned.

20. The combination of claim 12 further characterized in that the venting means comprises a valve positively actuated by the piston and the valve means controlling the by-pass connection is a slide valve having a lost motion connection with said piston.

21. The combination of claim 15 further characterized in that the venting means comprises a valve positively connected with said piston and the valve means controlling the by-pass connection comprises a slide valve having a lost motion connection with said piston.

22. The combination of claim 15 further characterized in that the venting means comprises a valve positively connected with said piston and the valve means controlling the by-pass connection comprises a slide valve having a lost motion connection with said piston, the last-named valve being in a chamber isolated from said balancing chamber and fed from the auxiliary reservoir through a check valve.

23. The combination of claim 15 further characterized in that the venting means comprises a valve positively connected with said piston and the valve means controlling the by-pass connection comprises a slide valve having a lost motion connection with said piston, the last-named slide valve being mounted in a chamber isolated from said balancing chamber and fed from the auxiliary reservoir through a check valve, the diaphragm being subject to auxiliary reservoir pressure in said chamber and arriving through said check valve.

24. The combination with a brake system including a triple valve, auxiliary reservoir, brake pipe and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure; valve means actuated by said piston normally clossing a by-pass connection between the auxiliary reservoir and the brake pipe and shiftable to a position in which the by-pass connection is opened by extreme motion of the piston toward the balancing chamber; and pressure actuated valve means responsive to brake pipe pressure and serving to isolate said piston from said brake pipe when brake pipe pressure is below a given value.

25. The combination with a brake system, including a triple valve, auxiliary reservoir, brake pipe and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure; valve means actuated by said piston normally closing a by-pass connection between the auxiliary reservoir and the brake pipe and shiftable to a position in which the by-pass connection is opened by extreme motion of the piston toward the balancing chamber; and pressure actuated valve means responsive to brake pipe pressure and serving to isolate said piston from said brake pipe when brake pipe pressure is below a given value and to vent pressure from the brake pipe side of said piston.

26. The combination with a brake system including a triple valve, auxiliary reservoir, brake pipe and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduciton of brake pipe pressure; valve means actuated by said piston normally closing a by-pass connection between the auxiliary reservoir and the brake pipe and shiftable to a position in which the by-pass connection is opened by extreme motion of the piston toward the balancing chamber;

a shiftable stop normally effective to prevent motion of said valve means to the last-named position; means responsive, in part at least, to brake pipe pressure and serving upon reduction thereof to shift said stop to an ineffective position; and pressure actuated valve means responsive to brake pipe pressure and serving to isolate said piston from said brake pipe when brake pipe pressure is below a given value.

27. The combination with a brake system including a triple valve, auxiliary reservoir, brake pipe and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure; valve means actuated by said piston normally closing a by-pass connection between the auxiliary reservoir and the brake pipe and shiftable to a position in which the by-pass connection is opened by extreme motion of the piston toward the balancing chamber; a shiftable stop normally effective to prevent motion of said valve means to the last-named position; means responsive, in part at least, to brake pipe pressure and serving upon reduction to shift said stop to an ineffective position; and pressure actuated valve means responsive to brake pipe pressure and serving to isolate said piston from said brake pipe when brake pipe pressure is below a given value and to vent pressure from the brake pipe side of said piston.

28. The combination with a brake system including a triple valve, auxiliary reservoir, brake pipe and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure, and to vent the chamber when the piston has responded to an emergency reduction of brake pipe pressure; valve means actuated by said piston normally closing a by-pass connection between the auxiliary reservoir and the brake pipe and shiftable to a position in which the by-pass connection is opened by extreme motion of the piston toward the balancing chamber; an abutment capable of limited motion and subject in opposing directions to brake pipe pressure and auxiliary reservoir pressure, said abutment serving when brake pipe pressure predominates to limit the motion of the piston toward the balancing chamber; and pressure actuated valve means responsive to brake pipe pressure and serving to isolate said piston from said brake pipe when brake pipe pressure is below a given value.

29. The combination with a brake system including a triple valve, auxiliary reservoir, brake pipe and brake cylinder, of a balancing chamber; a piston interposed between the brake pipe and said balancing chamber and controlling charging of said chamber; venting means for said chamber actuated by said piston to limit the response of the piston to service rate reductions of brake pipe pressure; and to vent the chamber when the piston has responded to an emergency reduction of brake pipe pressure valve means actuated by said piston normally closing a by-pass connection between the auxiliary reservoir and the brake pipe and shiftable to a position in which the by-pass connection is opened by extreme motion of the piston toward the balancing chamber; and means for terminating the venting of said balancing chamber before said chamber is completely vented.

30. In a brake system, the combination of an auxiliary reservoir, a supplemental reservoir, a brake pipe, a brake cylinder, a triple valve having a release position in which it exhausts the brake cylinder and controls charging of said reservoirs, a service position in which it connects auxiliary reservoir with the brake cylinder and isolates the supplemental reservoir, an emergency position in which it connects the auxiliary reservoir, supplemental reservoir and brake cylinder together, and an emergency lap position in which said supplemental reservoir is isolated; a balancing chamber; a piston interposed between the brake pipe and balancing chamber and controlling charging flow from the brake pipe to said chamber; venting means actuated by said piston to vent said chamber at a service rate when brake pipe pressure is reduced at a service rate, and to vent said chamber completely when brake pipe pressure is reduced at an emergency rate; and valve means actuated by said piston, said valve means having a normal position, an emergency position, and a feed back position, which last is assumed when the valve is moved by extreme motion of the piston toward the balancing chamber, said valve being interposed in the port controlled by the triple valve leading between the auxiliary reservoir and the supplemental reservoir, and said valve also controlling a port connecting the auxiliary reservoir and brake pipe, the valve serving in normal position to establish a connection from the supplemental reservoir to the auxiliary reservoir under control of the triple valve, serving in emergency position to establish a direct connection between the auxiliary and supplemental reservoirs, and serving in feed back position to isolate said reservoirs from each other and connect the auxiliary reservoir with the brake pipe.

31. In a brake system, the combination of a brake pipe; an auxiliary reservoir; a supplemental reservoir; a brake cylinder; a triple valve, said triple valve controlling a communication between the auxiliary and supplemental reservoirs; a feed back valve interposed in said communication in series with the triple valve; means for actuating said feed back valve, said means comprising a balancing chamber, a piston interposed between said brake pipe and balancing chamber; means actuated by motion of the piston for venting said balancing chamber; and means for controlling motion of said feed back valve to its feed back position and for restoring said feed back valve to its normal position, said means including an abutment interposed between auxiliary reservoir and brake pipe pressures.

32. In a feed back valve, the combination of a balancing chamber; a chamber connected with the brake pipe; a piston interposed between said chambers and controlling charging of the balancing chamber from the brake pipe chamber; venting means for the balancing chamber actuated by said piston; a feed back valve controlling flow from an auxiliary reservoir connection to a brake pipe connection; a lost motion driving connection between said valve and said piston; and a fluid pressure actuated stop for controlling the motion of said valve.

33. In a feed back valve, the combination of a balancing chamber; a chamber connected with the brake pipe; a piston interposed between said chambers and controlling charging of the balancing chamber from the brake pipe chamber; venting means for the balancing chamber actuated by said piston; a feed back valve controlling flow from an auxiliary reservoir connection to a brake pipe connection; a lost motion driving connection between said valve and said piston; and combined motion limiting and restoring means for said feed back valve comprising a shiftable stop, and an abutment operatively connected with said stop and subject in opposing directions to brake pipe and auxiliary reservoir pressures.

34. The combination with a brake pipe, brake cylinder, auxiliary reservoir, supplemental reservoir and triple valve; of a feed back valve mechanism comprising a balancing chamber; a chamber connected with the brake pipe; a piston interposed between said chambers and controlling charging of the balancing chamber from the brake pipe; venting means for said balancing chamber actuated by said piston; a feed back valve having a lost motion driving connection with said piston, said feed back valve serving upon restoration of brake pipe pressure after a brake pipe pressure reduction to connect the auxiliary reservoir with the brake pipe, and serving to control, in series with the triple valve, a connection between the auxiliary reservoir and the supplemental reservoir; and a combined motion limiting and restoring mechanism for said feed back valve, comprising a shiftable stop and an abutment operatively connected with said stop and subject in opposing directions to brake pipe and auxiliary reservoir pressures.

35. In a brake system, the combination of a brake pipe; an auxiliary reservoir; a supplemental reservoir; a brake cylinder; a triple valve, said triple valve controlling flow from the auxiliary and supplemental reservoirs to the brake cylinder; normally inactive means associated with the triple valve for isolating the supplemental reservoir and establishing communication from the auxiliary reservoir and brake cylinder to the brake pipe; and means for actuating the last named means, and rendered effective by an emergency reduction of brake pipe pressure and the subsequent partial restoration thereof through a definite range.

36. In a brake system, the combination of a brake pipe; an auxiliary reservoir; a supplemental reservoir; a brake cylinder; a triple valve, said triple valve controlling the charging of the auxiliary and supplemental reservoirs in release and the admission of auxiliary reservoir air to the brake cylinder in service applications; valve means associated with the triple valve and having at least two positions, in the first of which it connects said reservoirs, and in the second of which it isolates said reservoirs from each other and establishes a communication from the auxiliary reservoir and brake cylinder to the brake pipe; means comprising a piston subject on one side to brake pipe pressure and subject on the other side to pressure in a balancing chamber, said piston controlling the charging of the balancing chamber from the brake pipe and being connected to actuate said associated valve means to shift the same to the first named position upon an emergency reduction of brake pipe pressure, and to the second named position upon the subsequent partial restoration of brake pipe pressure; and piston actuated means for delaying the last named motion of the first named piston until brake pipe pressure has risen through a definite range.

37. In a brake system, the combination of a brake pipe; an auxiliary reservoir; a supplemental reservoir; a brake cylinder; a triple valve, said triple valve controlling a communication open in release position between the auxiliary and supplemental reservoirs; a feed back valve interposed in series with the triple valve; and means for actuating said feed back valve to its feed back position, in which it interrupts said communication, said means being rendered effective by an emergency reduction of brake pipe pressure, and the subsequent partial restoration thereof through a definite range.

38. In a brake system, the combination of a brake pipe; an auxiliary reservoir; a supplemental reservoir; a brake cylinder; a triple valve, said triple valve controlling a communication open in release position between the auxiliary and supplemental reservoirs; a feed back valve interposed in said communication in series with the triple valve; and means for actuating said feed back valve to its feed back position in which it interrupts said communication, said means being rendered effective by a reduction of brake pipe pressure at an emergency rate, and the subsequent partial restoration of brake pipe pressure through a definite range.

39. In brake system, the combination of a brake pipe; an auxiliary reservoir; a supplemental reservoir; a brake cylinder; a triple valve, said triple valve controlling a communication between the auxiliary and supplemental reservoirs; a feed back valve interposed in said communication in series with the triple valve; means for actuating said feed back valve to its feed back position, said means being rendered effective by an emergency reduction of brake pipe pressure, and the subsequent partial restoration thereof through a definite range; and valve means rendered effective by an emergency reduction of brake pipe pressure, and serving to prevent brake pipe pressure from thereafter acting upon said feed back valve until brake pipe pressure has increased through said definite range.

40. In a brake system, the combination of a brake pipe; an auxiliary reservoir; a supplemental reservoir; a brake cylinder; a triple valve, said triple valve controlling a communication between the auxiliary and supplemental reservoirs; a feed back valve interposed in said communication in series with the triple valve; means for actuating said feed back valve to its feed back position, said means being rendered effective by a reduction of brake pipe pressure at an emergency rate, and the subsequent partial restoration of brake pipe pressure through a definite range; and valve means rendered effective by an emergency reduction of brake pipe pressure, and serving to prevent brake pipe pressure from thereafter acting upon said feed back valve until brake pipe pressure has increased through said definite range.

41. In a brake system, the combination of a brake pipe; an auxiliary reservoir; a supplemental reservoir; a brake cylinder; a triple valve, said triple valve controlling charging of the auxiliary and supplemental reservoirs in release and the admission of auxiliary reservoir air to the brake cylinder in service applications; valve means associated with the triple valve and having at least two positions, in the first of which it connects said reservoirs independently of the triple valve and in the second of which it isolates said reservoirs from each other and establishes a communication from the auxiliary reservoir and brake cylinder to the brake pipe; and means responsive to brake pipe pressure and arranged to actuate said associated valve means to shift the same to the first named position upon an emergency reduction of brake pipe pressure, and thereafter upon a partial restoration of brake pipe pressure through a definite range, to shift said valve means to the second named position.

42. In a brake system the combination of a brake pipe; an auxiliary reservoir; a supplemental reservoir; a brake cylinder; a triple valve, said triple valve controlling the charging of the auxiliary and supplemental reservoirs in release and the admission of auxiliary reservoir air to the brake cylinder in service applications; valve means associated with the triple valve and having at least two positions, in the first of which it connects said reservoirs, and in the second of which it isolates said reservoirs from each other and establishes a communication from the auxiliary reservoir and brake cylinder to the brake pipe; means comprising a piston subject on one side to brake pipe pressure and subject on the other side to pressure in a balancing chamber, said piston being connected to actuate said associated valve means to shift the same to the first named position upon an emergency reduction of brake pipe pressure, and to the second named position upon the subsequent partial restoration of brake pipe pressure; and piston actuated means for delaying the last named motion of the first named piston until brake pipe pressure has risen through a definite range.

43. A feed back mechanism for use in conjunction with a triple valve having auxiliary reservoir and brake cylinder connections, said feed back mechanism comprising in combination, a balancing chamber; a chamber connected with the brake pipe; a piston interposed between said chambers, and controlling charging of the balancing chamber from the brake pipe chamber and venting of the balancing chamber at a service rate during service reductions of brake pipe pressure; a feed back valve controlling back flow from the brake cylinder and auxiliary reservoir connections of the triple valve to the brake pipe connection; a lost motion driving connection between said feed back valve and said piston; and a fluid pressure actuated stop for controlling the motion of said feed back valve.

44. A feed back mechanism for use in conjunction with a triple valve having auxiliary reservoir and brake cylinder connections, said feed back mechanism comprising in combination, a feed back valve controlling back flow from the brake cylinder and auxiliary reservoir connections of the triple valve to the brake pipe connection thereof; a piston responsive to brake pipe pressure and connected to actuate said feed back valve, said piston upon an emergency reduction of pressure, serving to position said valve to interrupt back flow, and upon subsequent restoration of brake pipe pressure, shifting said valve to permit such back flow; and piston actuated means controlled by brake pipe pressure and conditioned by an emergency reduction thereof, to prevent the first named piston from responding to increased brake pipe pressure until such pressure is increased through a definite range.

45. In a fluid pressure brake, the combination with a brake pipe, brake cylinder, auxiliary reservoir and a brake controlling valve device operated upon a reduction of brake pipe pressure for supplying fluid under pressure from the auxiliary reservoir to the brake cylinder, of a valve device operated upon an increase of brake pipe pressure after an application for venting fluid from the auxiliary reservoir to facilitate the release movement of the brake controlling valve device; and fluid pressure actuated means rendered effective by an emergency reduction of brake pipe pressure to inhibit upon rise of brake pipe pressure said operation of said valve device until brake pipe pressure attains a definite value.

46. In a fluid pressure brake, the combination with a brake pipe, brake cylinder and a triple valve device operated upon emergency reduction in brake pipe pressure for supplying fluid under pressure to the brake cylinder, of an emergency reservoir and a second valve device operated upon an emergency reduction in brake pipe pressure for supplying fluid under pressure from the emergency reservoir to the brake cylinder, said second valve device being operated, after an emergency application of the brakes, by an increase in brake pipe pressure to connect the brake cylinder with the brake pipe; and a fluid pressure actuated shiftable stop for controlling the movement of said second valve device.

47. In a fluid pressure brake, the combination with a brake pipe, brake cylinder and a triple valve device operated upon emergency reduction in brake pipe pressure for supplying fluid under pressure to the brake cylinder, of an emergency reservoir and a second valve device operated upon an emergency reduction in brake pipe pressure for supplying fluid under pressure from the emergency reservoir to the brake cylinder, said second valve device being operated, after an emergency application of the brakes, by an increase in brake pipe pressure to connect the brake cylinder with the brake pipe; and fluid pressure actuated means for delaying the last-named operation of said second valve device until brake pipe pressure has been increased to a definite value.

48. In a fluid pressure brake, the combination with a brake pipe, brake cylinder, auxiliary reservoir and an equalizing valve device operated upon a reduction in brake pipe pressure for supplying fluid under pressure from the auxiliary reservoir to the brake cylinder, of an emergency reservoir and a second valve device operated upon a sudden reduction in brake pipe pressure to supply fluid under pressure from the emergency reservoir to the brake cylinder to effect an emergency application of the brakes, and operated upon an increase in brake pipe pressure for connecting the auxiliary reservoir and brake cylinder with the brake pipe; and a fluid pressure actuated stop for controlling the movement of said second valve device.

49. In a fluid pressure brake, the combination with a brake pipe, brake cylinder, auxiliary reservoir, and an equalizing valve device operated upon a reduction in brake pipe pressure for supplying fluid under pressure from the auxiliary reservoir to the brake cylinder, of an emergency reservoir and a second valve device operated upon a sudden reduction in brake pipe pressure to supply fluid under pressure from the emergency reservoir to the brake cylinder to effect an emergency application of the brakes, and operated upon an increase in brake pipe pressure for connecting the auxiliary reservoir and brake cylinder with the brake pipe; and fluid pressure actuated means for delaying the last-named operation of said second valve device until brake pipe pressure has been increased to a definite value.

50. In a fluid pressure brake, the combination with a brake pipe, auxiliary reservoir, and a brake cylinder, of a valve device having a normal position, and an inner position in which the auxiliary reservoir is connected to the brake pipe, and operated upon an emergency reduction in brake pipe pressure for controlling a supply of fluid under pressure to the brake cylinder, said valve device being movable to its inner position upon an increase in brake pipe pressure after an emergency reduction of brake pipe pressure; and a fluid pressure actuated stop for controlling motion of said valve device to said inner position.

51. In a fluid pressure brake, the combination of a brake pipe; an auxiliary reservoir; a brake cylinder; a valve device comprising a piston subject to brake pipe pressure, and a valve operated by said piston upon an emergency reduction of brake pipe pressure for supplying fluid under pressure to the brake cylinder, said piston and valve having a normal position, and another position in which the auxiliary reservoir is connected with the brake pipe, said piston and valve being movable to said other position upon an increase in brake pipe pressure after an emergency reduction of brake pipe pressure; and fluid pressure actuated means for delaying motion to said other position until brake pipe pressure has been increased to a definite value.

52. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder; means operated upon an increase in brake pipe pressure after an emergency reduction of brake pipe pressure for supplying fluid from the brake cylinder and the auxiliary reservoir to the brake pipe with communication from the emergency reservoir to the brake pipe cut off; and fluid pressure operated means for delaying the operation of the last-named means until brake pipe pressure has attained a definite value.

53. In a fluid pressure brake, the combination with a brake pipe, brake cylinder, auxiliary reservoir, and an emergency reservoir, of means operated upon an emergency reduction of brake pipe pressure for supplying fluid under pressure from the auxiliary reservoir and the emergency reservoir to the brake cylinder; means operated upon an increase in brake pipe pressure after an emergency application for supplying fluid from the brake cylinder and the auxiliary reservoir to the brake pipe; fluid pressure actuated means for delaying the operation of the last-named means until brake pipe pressure attains a definite value; and means for thereafter supplying fluid from the emergency reservoir to the auxiliary reservoir.

54. In a fluid pressure brake, the combination with a brake pipe, brake cylinder, auxiliary reservoir and an emergency reservoir, of a brake controlling valve device operated upon an emergency reduction in brake pipe pressure for supplying fluid under pressure from the auxiliary reservoir to the brake cylinder, and operated upon an increase in brake pipe pressure for establishing communication from the emergency reservoir to the auxiliary reservoir; an emergency valve device operated upon an emergency reduction in brake pipe pressure for supplying fluid under pressure from the emergency reservoir to the brake cylinder and upon an increase in brake pipe pressure for supplying fluid from the brake cylinder to the brake pipe with communication from the emergency reservoir to the brake pipe cut off; and fluid pressure actuated means for delaying the last-named response of the emergency valve device to increased brake pipe pressure until such pressure attains a definite value.

55. In a fluid pressure brake, the combination of a brake pipe, brake cylinder, auxiliary reservoir and an emergency reservoir, of means operated upon emergency reduction of brake pipe pressure for supplying fluid under pressure from the auxiliary reservoir and emergency reservoir to the brake cylinder; means operated upon an increase in brake pipe pressure after an emergency application for first supplying fluid from the brake cylinder and the auxiliary reservoir to the brake pipe with communication from the emergency reservoir to the brake pipe cut off; fluid pressure operated means for delaying response of the last-named means to increase of brake pipe pressure until said pressure attains a definite value; and means for thereafter supplying fluid from the emergency reservoir to the auxiliary reservoir.

56. In a fluid pressure brake, the combination with a brake pipe, brake cylinder, auxiliary reservoir, and an emergency reservoir, of means, including an emergency valve device and a triple valve device, operable upon a sudden reduction in brake pipe pressure for supplying fluid under pressure from the auxiliary reservoir and emergency reservoir to the brake cylinder and operable upon an increase in brake pipe pressure for effecting the release of the brakes, said emergency valve device being operable to release position to first supply fluid from the auxiliary reservoir and the brake cylinder to the brake pipe and said triple valve device being operable to release position for then supplying fluid from the emergency reservoir to the auxiliary reservoir; and fluid pressure operated means for delaying the operation of said emergency valve device to release position until brake pipe pressure rises to a chosen value which is lower than that necessary to operate the triple valve device to effect release of the brakes.

57. In a fluid pressure brake, the combination with the brake pipe, brake cylinder and auxiliary reservoir, of a valve device operated upon a sudden reduction in brake pipe pressure for controlling a supply of fluid under pressure to the brake cylinder and operated upon an increase in brake pipe pressure after a sudden reduction in brake pipe pressure for supplying fluid under pressure from the auxiliary reservoir to the brake pipe; and pressure motor actuated means for terminating the last-named function of said valve device before equalization occurs between auxiliary reservoir and brake pipe pressure.

58. In a fluid pressure brake, the combination of a brake pipe, brake cylinder and auxiliary reservoir, of a valve device shiftable in response to a sudden reduction in brake pipe pressure to a position in which it controls a supply of fluid under pressure to the brake cylinder, and shiftable upon an increase in brake pipe pressure after a sudden reduction in brake pipe pressure to a position in which it controls the supply of fluid under pressure from the auxiliary reservoir to the brake pipe; and pressure actuated means responsive to approach to equalization between brake pipe and auxiliary reservoir pressures for shifting said valve device from the last-named position.

59. In a fluid pressure brake, the combination with a brake pipe, auxiliary reservoir, and a brake cylinder, of a chamber; a valve device including valve actuating means subject to the opposing pressures of the brake pipe and said chamber, and operated upon an increase in brake pipe pressure following an application of the brakes for effecting a supply of fluid under pressure from the auxiliary reservoir to the brake pipe; and pressure actuated means for delaying such action of the valve device until brake pipe pressure attains a definite value.

60. In a fluid pressure brake, the combination with a brake pipe, auxiliary reservoir, and a brake cylinder, of a chamber, a piston interposed between the brake pipe and such chamber and controlling the charging of said chamber from the brake pipe; and a valve device arranged to be operated by said piston and shiftable thereby, upon an increase in brake pipe pressure through a definite range following an application of the brakes for effecting a supply of fluid under pressure from the auxiliary reservoir to the brake pipe.

61. In a fluid pressure brake, the combination with a brake pipe, auxiliary reservoir, and a brake cylinder, of a chamber, a piston interposed between the brake pipe and such chamber and controlling the charging of said chamber from the brake pipe; a valve device arranged to be operated by said piston, and shiftable thereby upon an increase in brake pipe pressure following an application of the brakes, for effecting a supply of fluid under pressure from the auxiliary reservoir to the brake pipe; and means for assuring such action of the valve device when increasing brake pipe pressure attains a definite value.

62. The combination with a brake system including a triple valve, auxiliary reservoir, supplemental reservoir, brake pipe, and brake cylinder, of a balancing chamber; a piston interposed between the brake pipe and balancing chamber and controlling charging flow from the brake pipe to said chamber; venting means for said chamber actuated by said piston to limit the response of the piston to service rate reductions of brake pipe pressure, and to vent the chamber when the piston has responded to an emergency reduction of brake pipe pressure, valve means actuated by said piston, normally closing a by-pass connection between the auxiliary reservoir and brake pipe, shiftable to a position in which said by-pass connection is opened when the piston moves toward the vented balancing chamber under rising brake pipe pressure, and serving in emergency position to connect said supplemental and auxiliary reservoirs; and fluid pressure operated means serving to inhibit motion of the last-named valve means to the position in which said by-pass connection is opened, until rising brake pipe pressure has attained a definite value.

63. The combination with a brake pipe, brake cylinder, auxiliary reservoir, supplemental reservoir and triple valve; of a feed back valve mechanism comprising a balancing chamber; a chamber connected with the brake pipe; a piston interposed between said chambers and controlling charging of the balancing chamber from the brake pipe; venting means for said balancing chamber actuated by said piston; a feed back valve having a lost motion driving connection with said piston, said feed back valve serving upon restoration of brake pipe pressure after a brake pipe pressure reduction to connect the auxiliary reservoir with the brake pipe, and serving to control, in series with the triple valve, a connection between the auxiliary reservoir and the supplemental reservoir; and a fluid pressure actuated stop controlling the motion of said feed back valve.

64. In a fluid pressure brake, the combination with a brake pipe and a brake cylinder, of a brake controlling valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, said brake controlling valve mechanism comprising a triple valve device and an emergency valve device, an inshot valve device for controlling a communication through which fluid under pressure is supplied to the brake cylinder in effecting both a service and an emergency application of the brakes, said inshot valve device being responsive to a predetermined brake cylinder pressure in effecting an emergency application for closing said communication and being unresponsive to brake cylinder pressure to close said communication in effecting a service application, and means included in said service valve device for conditioning said inshot valve device to be responsive or unresponsive to brake cylinder pressure to close said communication.

65. In a fluid pressure brake, the combination with a brake pipe and a brake cylinder, of a brake controlling valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, said brake controlling valve mechanism comprising a triple valve device and an emergency valve device, an inshot valve device for controlling a communication through which fluid under pressure is supplied to the brake cylinder in effecting both a service and an emergency application of the brakes, said inshot valve device being responsive to a predetermined brake cylinder pressure in effecting an emergency application for closing said communication and being unresponsive to brake cylinder pressure to close said communication in effecting a service application, and means included in said service valve device for subjecting said inshot valve device to fluid pressure in effecting a service application of the brakes for rendering the inshot valve device unresponsive to brake cylinder pressure to close said communication.

66. In a fluid pressure brake, the combination with a brake pipe and a brake cylinder and at least one reservoir, of a brake controlling valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, said brake controlling valve mechanism comprising a triple valve device and an emergency valve device, an inshot valve device for controlling a communication through which fluid under pressure is supplied to the brake cylinder in effecting both a service and an emergency application of the brakes, said inshot valve device being responsive to a predetermined brake cylinder pressure in effecting an emergency application for closing said communication and being unresponsive to brake cylinder pressure to close said communication in effecting a service application, and means included in said service valve device for subjecting said inshot valve device to fluid at brake cylinder pressure in effecting a service application of the brakes for rendering the inshot valve device unresponsive to brake cylinder pressure to close said communication.

67. In a fluid pressure brake, the combination with a brake pipe and a brake cylinder and at least one reservoir, of a brake controlling valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, said brake controlling valve mechanism comprising a triple valve device and an emergency valve device, an inshot valve device for controlling a communication through which fluid under pressure is supplied to the brake cylinder in effecting both a service and an emergency application of the brakes, said inshot valve device being responsive to a predetermined brake cylinder pressure in effecting an emergency application for closing said communication and being unresponsive to brake cylinder pressure to close said communication in effecting a service application, and means included in one of said valve devices for subjecting said inshot valve device to fluid at brake cylinder pressure in effecting a service application of the brakes for rendering the inshot valve device unresponsive to brake cylinder pressure to close said communication.

68. The combination with a braking unit comprising a brake pipe, brake cylinder, auxiliary reservoir and triple valve, of a feed back valve device having a feed back position in which it opens a one-way flow passage from the auxiliary reservoir to the brake pipe, and a normal position in which it closes said passage; means rendered effective by an emergency reduction of brake pipe pressure to condition said feed back valve device to be moved to feed back position upon an ensuing rise of brake pipe pressure; and pressure responsive means for restoring the feed back valve to said normal position as brake pipe and auxiliary reservoir pressures approach equalization and before equalization occurs.

69. The combination with a braking unit comprising brake pipe, brake cylinder, triple valve and at least one reservoir, of a feed back mechanism comprising a balancing chamber; a piston interposed between said balancing chamber and the brake pipe; means rendered effective by motion of said piston to control charging of said chamber; means operated by said piston to limit the response of said piston to service reductions of brake pipe pressure; means operated by said piston for venting said chamber when the piston has responded to an emergency reduction of brake pipe pressure; a valve actuated by said piston and serving to open a feed back connection from a reservoir to the brake pipe when said piston moves an abnormal distance toward said chamber; means including a spring and effective under running conditions to position said feed back valve in closed position; and means rendered effective by an emergency reduction of brake pipe pressure to prevent said piston from responding to an ensuing rise of brake pipe pressure until brake pipe pressure has been raised through a definite range, whereby upon such definite rise the piston and the feed back valve will be moved to feed back position.

70. In a fluid pressure brake, the combination with a brake pipe, an auxiliary reservoir and a brake cylinder, of an emergency valve mechanism having a normal position, a feed back position in which the auxiliary reservoir is connected with the brake pipe, and an emergency position to which it moves upon a sudden reduction in brake pipe pressure and in which it supplies fluid under pressure to the brake cylinder, said emergency valve mechanism being movable to its feed back position upon an increase in brake pipe pressure after a sudden reduction in brake pipe pressure; and means rendered effective by an emergency reduction of brake pipe pressure for maintaining the emergency valve mechanism out of the normal position until the brake pipe pressure has been increased sufficiently to ensure the valve mechanism moving through the normal position to the feed back position.

71. In a fluid pressure brake, the combination with a brake pipe, a reservoir and a brake cylinder, of a brake controlling valve device operated upon a sudden reduction in brake pipe pressure for supplying fluid under pressure to the brake cylinder, said brake controlling valve device being arranged to be operated upon a predetermined increase in brake pipe pressure at a predetermined rate after a sudden reduction in brake pipe pressure for supplying fluid under pressure from the reservoir to the brake pipe, and means associated with said valve device to condition the valve device to operate upon a predetermined increase in brake pipe pressure independently of the rate, for supplying fluid under pressure from the reservoir to the brake pipe.

72. In a fluid pressure brake, the combination with a brake pipe, a reservoir and a brake cylinder, of a brake controlling valve device operated upon a sudden reduction in brake pipe pressure for supplying fluid under pressure to the brake cylinder, said brake controlling valve device being arranged to operate upon a predetermined increase in brake pipe pressure at a predetermined rate after a sudden reduction in brake pipe pressure for supplying fluid under pressure from the reservoir to the brake pipe, and means associated with said brake controlling valve device for modifying the operating characteristics of the brake controlling device so as to operate to supply fluid from the reservoir to the brake pipe upon a predetermined increase in brake pipe pressure without regard to rate.

73. In a fluid pressure brake, the combination with a brake pipe, a reservoir and a brake cylinder, of an emergency valve mechanism having a normal position, a feed back position in which the reservoir is connected with the brake pipe and an emergency position to which it moves upon a sudden reduction in brake pipe pressure and in which it supplies fluid under pressure to the brake cylinder, said normal position being intermediate said feed back position and said emergency position, and said emergency valve mechanism being movable to feed back position from emergency position upon an increase in brake pipe pressure after a sudden reduction of brake pipe pressure; and means rendered effective by an emergency reduction of brake pipe pressure for maintaining the emergency valve mechanism out of the normal position until brake pipe pressure has been increased sufficiently to insure movement of the valve mechanism from emergency position through the normal position to the feed back position.

74. In a fluid pressure brake, the combination with a brake pipe, a reservoir, and a brake cylinder, of a chamber; a piston interposed between the brake pipe and said chamber and movable in response to brake pipe pressure for opening a port for charging said chamber; a valve device arranged to be operated by said piston and shiftable thereby upon an increase in brake pipe pressure following an application of the brakes for effecting a supply of fluid under pressure from said reservoir to said brake pipe; and means effective during a rise of brake pipe pressure following an emergency reduction thereof for inhibiting creep of said piston to the position for opening said port, until a definite brake pipe pressure has been established, and effective upon attainment of such pressure to ensure rapid movement of said piston to the position for effecting the supply of fluid from the reservoir to the brake pipe.

75. In a fluid pressure brake, the combination of a brake pipe, a reservoir, a chamber, means subject to the differential pressures of said pipe and said chamber for effecting a supply of fluid under pressure from said reservoir to said brake pipe upon an increase in brake pipe pressure following an application of the brakes, and means for insuring response of the first mentioned means to said increase in brake pipe pressure irrespective of the rate of said increase.

76. In a fluid pressure brake, the combination with a brake pipe and a reservoir, of an emergency valve device having a normal position and a feed back position in which said reservoir is connected to the brake pipe to supply air to the brake pipe, said valve device being operated upon an emergency reduction in brake pipe pressure for supplying fluid under pressure to effect an emergency application of the brakes, said emergency valve device being movable to said feed back position upon an increase in brake pipe pressure after an emergency reduction in brake pipe pressure, and means for insuring movement of said emergency valve device to said feed back position in response to a definite increase in brake pipe pressure irrespective of the rate of such increase.

77. In a fluid pressure brake system, the combination of a brake pipe, a brake cylinder, a plurality of reservoirs, a triple valve device responsive to pressure differentials between the brake pipe and one of said reservoirs, and controlling charging of the reservoirs, admission of reservoir pressure fluid to the brake cylinder and release of pressure fluid from the brake cylinder, a balancing chamber, means including a piston interposed between the balancing chamber and the brake pipe and controlling charging of said chamber from the brake pipe, and venting of said chamber, means controlled by said piston and serving to connect another reservoir with the brake cylinder and to isolate said other reservoir, feed back means associated with the last named means, and shiftable by said piston in response to an emergency reduction of brake pipe pressure followed by restoration of brake pipe pressure to a feed back position in which it connects one of said reservoirs with the brake pipe, means serving to disconnect the last named reservoir from the brake pipe upon approach to equalization of pressures therein, and means to ensure rapid motion to said feed back position when brake pipe pressure attains a definite value irrespective of the rate at which brake pipe pressure rises to such value.

CHARLES A. CAMPBELL.

CERTIFICATE OF CORRECTION.

Patent No. 2,051,326.  August 18, 1936.

CHARLES A. CAMPBELL.

It is hereby certified that error appears in the printed specification of the above numbered patent requiring correction as follows: Page 8, second column, lines 52 and 74; page 9, first column, lines 24, 44 and 65; same page, second column, lines 39 and 64; page 10, first column, line 12; and page 11, first column, line 71; claims 7, 8, 9, 10, 11, 13, 14, 15 and 29 respectively, after the word "pressure" insert a semicolon; page 11, first column, line 29, claim 27, after "reduc- tion" insert the word thereof; and that the said Letters Patent should be read with these corrections therein that the same may conform to the record of the case in the Patent Office.

Signed and sealed this 20th day of October, A. D. 1936.

Leslie Frazer
Acting Commissioner of Patents.

(Seal)